(12) United States Patent
Ziser et al.

(10) Patent No.: US 7,842,732 B2
(45) Date of Patent: Nov. 30, 2010

(54) MICROGELS IN NON-CROSSLINKABLE ORGANIC MEDIA

(75) Inventors: Torsten Ziser, Birkenau (DE); Thomas Früh, Mutterstadt (DE); Patrick Galda, Siebnon (CH); Werner Obrecht, Moers (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 10/573,374

(22) PCT Filed: Sep. 23, 2004

(86) PCT No.: PCT/EP2004/052290

§ 371 (c)(1),
(2), (4) Date: Aug. 8, 2007

(87) PCT Pub. No.: WO2005/030843

PCT Pub. Date: Apr. 7, 2005

(65) Prior Publication Data

US 2008/0064768 A1    Mar. 13, 2008

(30) Foreign Application Priority Data

Sep. 27, 2003    (DE) ................... 103 44 975

(51) Int. Cl.
*C08J 3/09*    (2006.01)
(52) U.S. Cl. .................... 516/98; 508/138; 525/191
(58) Field of Classification Search .............. 615/98; 516/98

See application file for complete search history.

(56) References Cited

U.S. PATENT DOCUMENTS

| | | | |
|---|---|---|---|
| 4,360,620 A | 11/1982 | Lindner et al. ............. 524/234 |
| 4,569,966 A * | 2/1986 | Piccirilli et al. ............ 524/589 |
| 4,681,565 A | 7/1987 | Gourlandt .................. 604/115 |
| 4,749,506 A | 6/1988 | Kitahara et al. .......... 252/62.54 |
| 4,863,990 A * | 9/1989 | Chiou et al. ............... 524/517 |
| 5,124,408 A | 6/1992 | Engels et al. ............. 525/215 |
| 5,238,977 A | 8/1993 | Piejko et al. ................ 523/201 |
| 5,331,025 A * | 7/1994 | Lavoie et al. ............... 523/437 |
| 5,395,891 A | 3/1995 | Obrecht et al. ............ 525/194 |
| 5,711,940 A | 1/1998 | Kuentz et al. |
| 5,968,555 A | 10/1999 | Yamaguchi ................. 424/501 |
| 5,976,232 A | 11/1999 | Gore ...................... 106/31.65 |
| 6,127,488 A | 10/2000 | Obrecht et al. ........... 525/333.3 |
| 6,133,364 A | 10/2000 | Obrecht et al. ............ 524/495 |
| 6,184,296 B1 | 2/2001 | Obrecht et al. ............ 525/232 |
| 6,207,757 B1 | 3/2001 | Obrecht et al. ............ 525/194 |
| 6,242,534 B1 | 6/2001 | Obrecht et al. ............ 525/191 |
| 6,372,857 B1 | 4/2002 | Obrecht et al. ........... 525/332.6 |
| 6,399,706 B1 * | 6/2002 | Obrecht et al. ............ 525/191 |
| 6,423,760 B1 | 7/2002 | Qiao et al. ................. 522/150 |
| 6,548,454 B1 * | 4/2003 | Yamamoto et al. .......... 508/138 |
| 6,573,346 B1 | 6/2003 | Melchiors et al. ........... 526/217 |
| 6,579,945 B2 | 6/2003 | Obrecht et al. ............ 525/192 |
| 6,620,866 B1 | 9/2003 | Obrecht et al. |
| 6,620,886 B2 | 9/2003 | Obrecht et al. ............ 525/191 |
| 6,632,888 B2 | 10/2003 | Obrecht et al. ............ 525/215 |
| 6,649,696 B2 | 11/2003 | Obrecht et al. ............ 525/125 |
| 6,737,478 B2 | 5/2004 | Obrecht et al. ............ 525/133 |
| 2001/0051685 A1 | 12/2001 | Obrecht et al. ............ 524/526 |
| 2002/0049282 A1 | 4/2002 | Obrecht et al. ............ 525/194 |
| 2002/0077414 A1 | 6/2002 | Obrecht |
| 2002/0082364 A1 | 6/2002 | Obrecht et al. ............ 525/535 |
| 2003/0088036 A1 | 5/2003 | Huang et al. ............... 525/523 |
| 2005/0197443 A1 * | 9/2005 | Ziser et al. ................ 524/474 |
| 2006/0252858 A1 | 11/2006 | Obrecht et al. ............ 524/160 |
| 2006/0254734 A1 | 11/2006 | Hannay et al. ............. 162/134 |
| 2006/0275690 A1 | 12/2006 | Fessenbecker et al. . 430/137.15 |
| 2006/0275691 A1 | 12/2006 | Fessenbecker et al. . 430/137.15 |
| 2007/0135573 A1 | 6/2007 | Ziser et al. ................ 525/119 |
| 2007/0232733 A1 | 10/2007 | Ziser et al. ................ 524/386 |
| 2008/0064768 A1 * | 3/2008 | Ziser et al. .................. 516/98 |
| 2008/0249241 A1 | 10/2008 | Heiliger et al. .............. 525/50 |

FOREIGN PATENT DOCUMENTS

| GB | 1078400 | 8/1967 |
|---|---|---|
| JP | 2-170848 | 7/1990 |
| JP | 20010342451 | 12/2001 |

OTHER PUBLICATIONS

Marketing Bulletin of APV Homogeniser Group "High-pressure homogenisers processes, product, and applications" by William D. Pandolfe and Peder Baekgaard.
Liu, Yi-qun et al; Chinese Journal of Polymer Science vol. 20, No. 2, (2002, 93-98 "Special Effect of Ultra-Fine Rubber Particles on Plastic Toughening".
P. Potschke et al; Kautschuk gummi Kunststoffe, 50 (11) (1997) 787 "Morphologie und Phasenstabilitat in schmelzegemischten Polymerblends mit thermoplastischen Polyurethanen".
H. G. Elias, Makromolekule, vol. 2, technologie, 5$^{th}$ edition, (1992), p. 99 et seq.
Römpp Lexikon, Lacke und Druckfarben, Herausgegeben von Ulrich Zorll, Georg Thieme Verlag, Stuttgart, New York, p. 472.
Translation of Japanese Office Action issued Oct. 2, 2009 in co-pending Japanese patent application (4 pages).

* cited by examiner

*Primary Examiner*—Ling-Siu Choi
*Assistant Examiner*—Chun-Cheng Wang
(74) *Attorney, Agent, or Firm*—Nicanor A. Kohncke

(57) ABSTRACT

The invention relates to a composition which comprises a specific non-crosslinkable medium and at least one microgel, processes for its preparation, uses of the compositions, and microgel-containing polymers, rubbers, lubricants, coatings etc. prepared therefrom.

26 Claims, 3 Drawing Sheets

MICROGELS IN NON-CROSSLINKABLE ORGANIC MEDIA

CROSS REFERENCE TO RELATED PATENT APPLICATIONS

The present patent application claims the right of priority under 35 U.S.C. §119 (a)-(d) and 35 U.S.C. §365 of International Application No. PCT/EP2004/052290, filed 23 Sep. 2004, which was published in German as International Patent Publication No. WO 2005/030843 A1 on 7 Apr. 2005, which is entitled to the right of priority of German Patent Application No. DE 103 44 975.2 filed on 27 Sep. 2003.

The invention relates to a composition which comprises at least one specific non-crosslinkable medium and at least one microgel, processes for its preparation, uses of the compositions, and microgel-containing polymers, rubbers, lubricants, coatings etc. prepared therefrom.

It is known to employ rubber gels, including modified rubber gels, in mixtures with the most diverse rubbers, for example in order to improve the rolling resistance in the production of motor vehicle tyres (see e.g. DE 42 20 563, GB-PS 10 78 400 EP 405 216 and EP 854 171). In this case, the rubber gels are always incorporated into solid matrices.

It is also known to incorporate printing ink pigments in finely distributed form into liquid media suitable for these, in order finally to prepare printing inks (see e.g. EP 0 953 615 A2, EP 0 953 615 A3). In this case, particle sizes down to 100 nm are achieved.

Various dispersing apparatuses, such as a kneader, bead mill, triple-roll mill or homogenizer, single- or multiple-screw extruder and/or a dissolver, are used for the dispersing. The use of homogenizers and the their mode of functioning is described in the Marketing Bulletin of APV Homogeniser Group—"High-pressure homogenisers processes, product and applications" by William D. Pandolfe and Peder Baekgaard, chiefly for the homogenization of emulsions.

The use of rubber gels as a solid component in mixtures with liquid organic media with the aim of preparing very finely distributed rubber gel dispersions having particle diameters significantly below one μm and homogenization thereof by means of a homogenizer is not described in the documents mentioned.

Chinese Journal of Polymer Science, volume 20, no. 2, (2002), 93-98 describes microgels which are completely crosslinked by high-energy radiation and their use for increasing the impact strength of plastics. In the preparation of specific epoxy resin compositions, a mixture of a radiation-crosslinked nitrile/butadiene microgel terminated by carboxyl and the diglycidyl ether of bisphenol A, a crosslinkable organic medium, intermediately occurs. Further liquid microgel-containing compositions are not described.

US 20030088036 A1 similarly discloses reinforced thermosetting resin compositions, for the preparation of which radiation-crosslinked microgel particles are likewise mixed with thermosetting prepolymers (see also EP 1262510 A1).

DE 2910154 discloses dispersions of rubber particles with organic solvents. These are prepared by adding the solvents to an aqueous rubber latex, with the addition of a dispersing agent. This specification indeed also mentions the possibility of removing the water resulting from the latex. However, anhydrous dispersions are not described. Dispersions which are substantially anhydrous practically cannot be obtained by this process (see also the acknowledgement in DE-A-3742180, page 2, line 10, of the same Applicant). However, this is a disadvantage in numerous uses. The dispersions described in the patents mentioned furthermore necessarily comprise additional dispersing agents or emulsifiers in order to achieve a homogeneous distribution of the aqueous and the organic phases. The presence of such emulsifiers or dispersing agents, however, is very troublesome in many uses. The rubber particles described there moreover are relatively coarse.

DE-A-3742180 discloses dispersions of silicone-containing graft polymers in liquid amides, which are likewise prepared from aqueous latices. In the dispersions described there, however, the water is only largely separated off and complete separating off is difficult. The silicone-containing graft polymers are moreover very coarse-particled (240 nm). The dispersions described there can be used for improving the fibrillation properties of PAN films. Because of their specific structure with a silicone core and acrylate shell, however, the graft polymers are unsuitable in particular for use in lubricants due to their incompatibility.

The inventors of the present invention have now found that it is possible for microgels to be distributed finely in liquid organic media of a certain viscosity, for example using a homogenizer. The division of the microgels in the organic medium down to within the primary particle range is a prerequisite, for example, for rendering the nanoproperties of the microgels usable, in particular reproducibly, in any uses, for example in the case of incorporation into plastics. The liquid compositions according to the invention comprising the specific microgels can open up a large number of new uses of microgels which were not hitherto accessible with the microgels themselves.

Thus, for example, in one embodiment of the invention, on the basis of the fine distributions which can be achieved the compositions according to the invention are incorporated, for example, into plastics and lubricants, as a result of which completely new properties are obtained. Compositions according to the invention thus show, surprisingly, properties comparable to those of commercial greases (stability towards settling out, low separation of oil, consistency etc.); however, they have more favourable properties in respect of e.g. shear stability (i.e. almost no change in the penetration values after milling with 60,000 strokes) and exceptionally high drop points such as are otherwise achieved only by heat-resistant greases, such as e.g. PU greases or Ca complex greases. Furthermore the compositions according to the invention display a positive action on coefficients of friction, which is completely untypical of standard greases.

The microgel-containing compositions according to the invention can be used in a large number of fields, such as e.g. in elastomeric PU systems (cold casting systems and hot casting systems), in coating compositions or as additives to lubricants. In the microgel-containing compositions according to the invention, materials which are incompatible per se form a homogeneous distribution which remains stable even during relatively long storage (6 months).

P. Pötschke et al., Kautschuk Gummi Kunststoffe, 50 (11) (1997) 787 show that in the case of incompatible materials, such as e.g. a p-phenylenediamine derivative as the dispersed phase and TPU as the surrounding phase, no domains smaller than 1.5 μm can be realized.

It is surprising that such small dispersed phases are achieved with the microgel compositions of the present invention.

Microgel-containing compositions have been found for which the most diverse rheological properties have been determined. In suitable microgel-containing compositions, surprisingly, a very high structural viscosity or thixotropy, but also flow properties similar to those of Newtonian fluids have been found. This can be utilized to control, in addition to other properties, the flow properties of any desired liquid compositions by microgels.

The present invention therefore provides a composition comprising at least one non-crosslinkable organic medium (A) which has a viscosity of less than 30,000 mPas at a temperature of 120° C. and at least one microgel (B).

Preferably, the viscosity of the organic medium is less than 1,000 mPas, more preferably less than 200 mPas, even more preferably less than 100 mPas at 120° C., even more preferably less than 20 mPas at 120° C. The viscosity of the non-crosslinkable organic medium (A) is determined at a speed of 5 s$^{-1}$ with a cone-plate measuring system in accordance with DIN 53018 at 120° C.

Microgels (B)

The microgel (B) used in the composition according to the invention is a crosslinked microgel. In a preferred embodiment, it is not a microgel which is crosslinked by high-energy radiation. High-energy radiation expediently means here electromagnetic radiation having a wavelength of less than 0.1 μm. The use of microgels which are crosslinked by high-energy radiation, as described, for example, in Chinese Journal of Polymer Science, volume 20, no. 2, (2002), 93-98, is disadvantageous since microgels which are crosslinked by high-energy radiation practically cannot be prepared on an industrial scale. The use of high-energy radiation from radioactive sources of radiation, such as radioactive cobalt, furthermore is accompanied by serious safety problems. Since the radiation-crosslinked microgels moreover as a rule are completely radiation-crosslinked microgels, the change in modulus from the matrix phase to the dispersed phase on incorporation of the composition according to the invention, for example into plastics, is direct. As a result, under sudden stress tear effects may occur between the matrix and the dispersed phase, whereby the mechanical properties, the swelling properties and the stress corrosion cracking etc. of the microgel-containing plastics prepared using the compositions according to the invention are impaired.

In a preferred embodiment of the invention, the primary particles of the microgel (B) have an approximately spherical geometry. According to DIN 53206:1992-08, primary particles are the microgel particles dispersed in the coherent phase which can be detected as individuals by suitable physical methods (electron microscope) (cf. e.g. Römpp Lexikon, Lacke und Druckfarben, Georg Thieme Verlag, 1998). An "approximately spherical" geometry means that the dispersed primary particles of the microgels substantially produce the image of a circular area detectable when the composition is viewed, for example with an electron microscope. Since the microgels substantially do not change their shape or morphology during further processing of the compositions according to the invention, the statements above and below also apply in the same manner to the microgel-containing compositions obtained with the composition according to the invention, such as e.g. plastics, coating compositions, lubricants or the like.

In the primary particles of the microgel (B) which are contained in the composition according to the invention, the deviation of the diameters of an individual primary particle, defined as $[(d1-d2)/d2] \times 100$, wherein d1 and d2 are any two desired diameters of the primary particle and d1 is >d2, is preferably less than 250%, more preferably less than 100%, even more preferably less than 80%, even more preferably less than 50%.

Preferably, at least 80%, more preferably at least 90%, even more preferably at least 95% of the primary particles of the microgel have a deviation of the diameters, defined as $[(d1-d2)/d2] \times 100$, wherein d1 and d2 are any two desired diameters of the primary particle and d1 is >d2, of less than 250%, preferably less than 100%, even more preferably less than 80%, even more preferably less than 50%.

The abovementioned deviation of the diameters of the individual particles can be determined by the following method. A thin section of the solidified composition according to the invention is first produced. A transmission electron microscopy photograph is then produced at a magnification of, for example, 10,000-fold or 200,000-fold. In an area of 833.7× 828.8 nm, the largest and the smallest diameter are determined as d1 and d2 on 10 microgel primary particles. If the deviation defined above in at least 80%, more preferably at least 90%, even more preferably at least 95% of the microgel primary particles measured is in each case below 250%, more preferably below 100%, even more preferably less than 80%, even more preferably below 50%, the microgel primary particles have the deviation feature defined above.

If the concentration of the microgels in the composition is so high that the visible microgel primary particles overlap considerably, the evaluability can be improved by prior suitable dilution of the measurement sample.

In the composition according to the invention, the primary particles of the microgel (B) preferably have an average particle diameter of 5 to 500 nm, more preferably 20 to 400 nm, more preferably 20 to 300 nm, more preferably 20 to 250 nm, even more preferably 20 to 99, even more preferably 40 to 80 nm (diameter values in accordance with DIN 53206). The preparation of particularly finely divided microgels by emulsion polymerization is carried out by controlling the reaction parameters in a manner known per se (see e.g. H. G. Elias, Makromoleküle, volume 2, Technologie, 5th edition, 1992, page 99 et seq.).

Since the morphology of the microgels substantially does not change during further processing of the composition according to the invention, the average particle diameter of the dispersed primary particles substantially corresponds to the average particle diameter of the dispersed primary particles in the further processing products obtained with the composition according to the invention, such as microgel-containing plastics, lubricants, coatings etc. This is a particular advantage of the composition according to the invention. To a certain extent tailor-made liquid storage-stable microgel formulations which have a defined morphology of the microgels and which the customer can easily process further in the desired uses can be made available to customers. Prior expensive dispersing, homogenization or even preparation of the microgels is no longer necessary, and for this reason it is to be expected that such microgels will also find use in fields where their use hitherto seemed to be too expensive.

In the composition according to the invention, the microgels (B) expediently have contents which are insoluble in toluene at 23° C. (gel content) of at least about 70 wt. %, more preferably at least about 80 wt. %, even more preferably at least about 90 wt. %.

The content which is insoluble in toluene is determined here in toluene at 23°. In this method, 250 mg of the microgel are swollen in 20 ml toluene for 24 hours at 23° C., while shaking. After centrifugation at 20,000 rpm, the insoluble content is separated off and dried. The gel content is given by the quotient of the dried residue and the amount weighed out and is stated in percent by weight.

In the composition according to the invention, the microgels (B) expediently have a swelling index in toluene at 23° C. of less than about 80, more preferably less than 60, even more preferably less than 40. The swelling indices of the microgels (Qi) can therefore particularly preferably be between 1-15 and 1-10. The swelling index is calculated from the weight of the solvent-containing microgel (after centrifugation at 20,000 rpm) which has been swollen in toluene at 23° for 24 hours and the weight of the dry microgel.

$Qi$=wet weight of the microgel/dry weight of the microgel.

To determine the swelling index, 250 mg of the microgel are swollen in 25 ml toluene for 24 h, while shaking. The gel is centrifuged off and weighed, and then dried to constant weight at 70° C. and weighed again.

In the composition according to the invention, the microgels (B) expediently have glass transition temperatures Tg of −100° C. to +120° C., more preferably −100° C. to +100° C., even more preferably −80° C. to +80° C. In rare cases, microgels which have no glass transition temperature because of their high degree of crosslinking can also be used.

Furthermore, the microgels (B) employed in the composition according to the invention preferably have a glass transition range of greater than 5° C., preferably greater than 10° C., more preferably greater than 20° C. Microgels which have such a glass transition range are as a rule not completely homogeneously crosslinked—in contrast to completely homogeneously radiation-crosslinked microgels. This means that the change in modulus from the matrix phase to the dispersed phase in the microgel-containing compositions of plastic which are prepared, for example, from the compositions according to the invention is not direct. As a result, under sudden stress on these compositions tear effects between the matrix and the dispersed phase do not occur, whereby the mechanical properties, the swelling properties and the stress corrosion cracking etc. are advantageously influenced.

The glass transition temperatures (Tg) and the glass transition range ($\Delta$Tg) of the microgels are determined by means of differential thermal analysis (DTA, also differential scanning calorimetry (DSC)) under the following conditions:

Two cooling down/heating up cycles are carried out for the determination of Tg and $\Delta$Tg. Tg and $\Delta$Tg are determined in the second heating up cycle. For the determinations, 10-12 mg of the selected microgel are introduced into a DSC sample container (standard aluminium pan) from Perkin-Elmer. The first DSC cycle is carried out by first cooling the sample down to −100° C. with liquid nitrogen and then heating it up to +150° C. at a rate of 20 K/min. The second DSC cycle is started by immediate cooling down of the sample as soon as a sample temperature of +150° C. is reached. The cooling down is carried out at a rate of approximately 320 K/min. In the second heating up cycle, the sample is heated up to +150° C. once again as in the first cycle. The rate of heating up in the second cycle is again 20 K/min. Tg and $\Delta$Tg are determined on a graph on the DSC curve of the second heating up operation. For this purpose, three straight lines are laid on the DSC curve. The 1st straight line is laid on the curve section of the DSC curve below Tg, the 2nd straight line is laid on the curve branch running through Tg which has the point of inflection and the 3rd straight line is laid on the curve branch of the DSC curve above Tg. Three straight lines with two points of intersection are obtained in this manner. The two points of intersection are each characterized by a characteristic temperature. The glass transition temperature Tg is obtained as the mean of these two temperatures and the glass transition range $\Delta$Tg is obtained from the difference between the two temperatures.

The microgels which are contained in the composition according to the invention and are preferably not crosslinked by high-energy radiation can be prepared in a manner known per se (see, for example, EP-A-405 216, EP-A-854171, DE-A 4220563, GB-PS 1078400, DE 197 01 489.5, DE 197 01 488.7, DE 198 34 804.5, DE 198 34 803.7, DE 198 34 802.9, DE 199 29 347.3, DE 199 39 865.8, DE 199 42 620.1, DE 199 42 614.7, DE 100 21 070.8, DE 100 38 488.9, DE 100 39 749.2, DE 100 52 287.4, DE 100 56 311.2 and DE 100 61 174.5). The use of CR, BR and NBR microgels in mixtures with rubbers containing double bonds is claimed in the patents/patent applications EP-A 405 216, DE-A 4220563 and in GB-PS 1078400. DE 197 01 489.5 describes the use of subsequently modified microgels in mixtures with rubbers containing double bonds, such as NR, SBR and BR.

Microgels are expediently understood as meaning rubber particles which are obtained, in particular, by crosslinking of the following rubbers:

BR: polybutadiene,
ABR: butadiene/acrylic acid C1-4-alkyl ester copolymers,
IR: polyisoprene,
SBR: styrene/butadiene copolymers having styrene contents of 1-60, preferably 5-50 percent by weight,
X-SBR: carboxylated styrene/butadiene copolymers,
FM: fluorinated rubber,
ACM: acrylate rubber,
NBR: polybutadiene/acrylonitrile copolymers having acrylonitrile contents of 5-60, preferably 10-50 percent by weight,
X-NBR: carboxylated nitrile rubbers,
CR: polychloroprene,
IIR: isobutylene/isoprene copolymers having isoprene contents of 0.5-10 percent by weight,
BIIR: brominated isobutylene/isoprene copolymers having bromine contents of 0.1-10 percent by weight,
CIIR: chlorinated isobutylene/isoprene copolymers having bromine contents of 0.1-10 percent by weight,
HNBR: partly and completely hydrogenated nitrile tubbers,
EPDM: ethylene/propylene/diene copolymers,
EAM: ethylene/acrylate copolymers,
EVM: ethylene/vinyl acetate copolymers,
CO and
ECO: epichlorohydrin rubbers,
Q: silicone rubbers, excluding silicone graft polymers,
AU: polyester-urethane polymers,
EU: polyether-urethane polymers,
ENR: epoxidized natural rubber or mixtures thereof.

The non-crosslinked microgel starting substances are expediently prepared by the following methods:
1. Emulsion polymerization
2. Solution polymerization of rubbers which are not accessible via variant 1
3. Naturally occurring latices, such as e.g. natural rubber latex, can moreover be employed.

In the composition according to the invention, the microgels (B) used are preferably those which are obtainable by emulsion polymerization and crosslinking.

The following monomers which can undergo free-radical polymerization are employed, for example, in the preparation, by emulsion polymerization, of the microgels used according to the invention: butadiene, styrene, acrylonitrile, isoprene, esters of acrylic and methacrylic acid, tetrafluoroethylene, vinylidene fluoride, hexafluoropropene, 2-chlorobutadiene, 2,3-dichlorobutadiene and carboxylic acids containing double bonds, such as e.g. acrylic acid, methacrylic acid, maleic acid, itaconic acid etc., hydroxy compounds containing double bonds, such as e.g. hydroxyethyl methacrylate, hydroxyethyl acrylate and hydroxybutyl methacrylate, amine-functionalized (meth)acrylates, acrolein, N-vinyl-2-pyrrolidone, N-allyl-urea and N-allyl-thiourea as well as secondary amino-(meth)acrylic acid esters, such as 2-tert-butylaminoethyl methacrylate, and 2-tert-butylaminoethylmethacrylamide etc. The crosslinking of the rubber gel can be achieved directly during the emulsion polymerization, such as by copolymerization with multifunctional compounds having a crosslinking action, or by subsequent crosslinking as described below. Direct crosslinking is a preferred embodiment of the invention. Preferred multifunctional comonomers are compounds having at least two, preferably 2 to 4 copolymerizable C=C double bonds, such as diisopropenylbenzene, divinylbenzene, divinyl ether, divinyl sulfone, diallyl phthalate, triallyl cyanurate, triallyl isocyanurate, 1,2-polybutadiene, N,N'-m-phenylenemaleimide, 2,4-toluylenebis (maleimide) and/or triallyl trimellitate. Compounds which are moreover possible are the acrylates and methacrylates of polyhydric, preferably 2- to 4-hydric C2 to C10 alcohols, such as ethylene glycol, propane-1,2-diol, butanediol, hexanediol, polyethylene glycol having 2 to 20, preferably 2 to 8 oxyethylene units, neopentylglycol, bisphenol A, glycerol, trimethylolpropane, pentaerythritol and sorbitol, with unsaturated polyesters from aliphatic di- and polyols and maleic acid, fumaric acid and/or itaconic acid.

The crosslinking to give rubber microgels during the emulsion polymerization can also be carried out by continuing the polymerization up to high conversions, or in the monomer feed process by polymerization with high internal conversions. Carrying out the emulsion polymerization in the absence of regulators is also another possibility.

For the crosslinking of the non-crosslinked or the weakly crosslinked microgel starting substances after the emulsion polymerization, the latices which are obtained in the emulsion polymerization are most preferably employed. In principle, this method can also be used on non-aqueous polymer dispersions which are accessible in another manner, such as e.g. by redissolving. Natural rubber latices can also be crosslinked in this manner.

Suitable chemicals having a crosslinking action are, for example, organic peroxides, such as dicumyl peroxide, t-butyl cumyl peroxide, bis-(t-butylperoxyisopropyl)benzene, di-t-butyl peroxide, 2,5-dimethylhexane 2,5-dihydroperoxide, 2,5-dimethylhexine 3,2,5-dihydroperoxide, dibenzoyl peroxide, bis-(2,4-dichlorobenzoyl) peroxide and t-butyl perbenzoate, and organic azo compounds, such as azo-bis-isobutyronitrile and azo-bis-cyclohexanensitrile, as well as di- and polymercapto compounds, such as dimercaptoethane, 1,6-dimercaptohexane, 1,3,5-trimercaptotriazine and mercapto-terminated polysulfide rubbers, such as mercapto-terminated reaction products of bis-chloroethylformal with sodium polysulfide.

The optimum temperature for carrying out the post-crosslinking of course depends on the reactivity of the crosslinking agent, and the post-crosslinking can be carried out at temperatures from room temperature up to approx. 180° C., optionally under increased pressure (in this context see Houben-Weyl, Methoden der organischen Chemie, 4th edition, volume 14/2, page 848). Peroxides are particularly preferred crosslinking agents.

The crosslinking of rubbers containing C=C double bonds to give microgels can also be carried out in dispersion or emulsion with simultaneous partial, optionally complete, hydrogenation of the C=C double bond by hydrazine, as described in U.S. Pat. No. 5,302,696 or U.S. Pat. No. 5,442,009, or optionally other hydrogenating agents, for example organometallic hydride complexes.

An increase in particle size by agglomeration can optionally be carried out before, during or after the post-crosslinking.

In the preparation process without the use of high-energy radiation preferably used according to the invention, incompletely homogeneously crosslinked microgels which can have the advantages described above are always obtained.

Rubbers which are prepared by solution polymerization can also serve as starting substances for the preparation of the microgels. In these cases solutions of these rubbers in suitable organic solvents are used as the starting substances.

The desired sizes of the microgels are established by mixing the rubber solution in a liquid medium, preferably in water, optionally with the addition of suitable surface-active auxiliary substances, such as e.g. surfactants, by means of suitable units so that a dispersion of the rubber in the suitable particle size range is obtained. The procedure for the crosslinking of the dispersed solution rubbers is as described previously for the subsequent crosslinking of emulsion polymers. Suitable crosslinking agents are the abovementioned compounds, it being possible for the solvent employed for the preparation of the dispersion optionally to be removed, e.g. by distillation, before the crosslinking.

Microgels which can be used for the preparation of the composition according to the invention are both non-modified microgels, which substantially contain no reactive groups, in particular on the surface, and modified microgels modified with functional groups, in particular on the surface. The latter microgels can be prepared by chemical reaction of the already crosslinked microgels with chemicals which are reactive towards C=C double bonds. These reactive chemicals are, in particular, those compounds with the aid of which polar groups, such as e.g. aldehyde, hydroxyl, carboxyl, nitrile etc. and sulfur-containing groups, such as e.g. mercapto, dithiocarbamate, polysulfide, xanthogenate, thiobenzothiazole and/or dithiophosphoric acid groups and/or unsaturated dicarboxylic acid groups, can be bonded chemically to the microgels. This also applies to N,N'-m-phenylenediamine. The aim of modification of the microgel is improvement in the compatibility of the microgel if the composition according to the invention is used for the preparation of the later matrix into which the microgel is incorporated or the composition according to the invention is used for incorporation into a matrix, in order to achieve a good distributability during the preparation and a good coupling.

Particularly preferred methods of modification are grafting of the microgels with functional monomers and reaction with low molecular weight agents.

For grafting of the microgels with functional monomers, the aqueous microgel dispersion is expediently used as the starting material, which is reacted with polar monomers, such as acrylic acid, methacrylic acid, itaconic acid, hydroxyethyl (meth)acrylate, hydroxypropyl (meth)acrylate, hydroxybutyl (meth)acrylate, acrylamide, methacrylamide, acrylonitrile, acrolein, N-vinyl-2-pyrrolidone, N-allyl-urea and N-allyl-thiourea, and secondary amino-(meth)acrylic acid esters, such as 2-tert-butylaminoethyl methacrylate, and 2-tert-butylaminoethylmethacrylamide, under the conditions of a free-radical emulsion polymerization. Microgels having a core/shell morphology, wherein the shell should have a high compatibility with the matrix, are obtained in this manner. It is desirable for the monomer used in the modification step to be grafted as quantitatively as possible on to the non-modified microgel. The functional monomers are expediently metered in before the complete crosslinking of the microgels.

Grafting of the microgels in non-aqueous systems is in principle also conceivable, a modification with monomers by ionic polymerization methods also becoming possible in this manner.

The following reagents are possible in particular for surface modification of the microgels with low molecular weight agents: elemental sulfur, hydrogen sulfide and/or alkylpolymercaptans, such as 1,2-dimercaptoethane or 1,6-dimercaptohexane, moreover dialkyl- and dialkylaryldithiocarbamate, such as the alkali metal salts of dimethyldithiocarbmate and/or dibenzyldithiocarbamate, furthermore alkyl- and arylxanthogenates, such as potassium methylxanthogenate and sodium isopropylxanthogenate, as well as reaction with the alkali metal or alkaline earth metal salts of dibutyidithiophopshoric acid and dioctyldithiophosphoric acid as well as dodecyldithiophosphoric acid. The reactions mentioned can advantageously also be carried out in the presence of sulfur, the sulfur being co-incorporated with the formation of polysulfidic bonds. Free radical initiators, such as organic and inorganic peroxides and/or azo initiators, can be added for the addition of this compound.

A modification of microgels containing double bonds, such as e.g. by ozonolysis and by halogenation with chlorine, bromine and iodine, is also possible. A further reaction of modified microgels, such as e.g. the preparation of microgels modified by hydroxyl groups from epoxidized microgels, is also understood as chemical modification of microgels.

In a preferred embodiment, the microgels are modified by hydroxyl groups, in particular also on the surface thereof. The hydroxyl group content of the microgels is determined as the hydroxyl number with the dimension mg KOH/g polymer by reaction with acetic anhydride and titration of the acetic acid thereby liberated with KOH in accordance with DIN 53240. The hydroxyl number of the microgels is preferably between 0.1-100, even more preferably between 0.5-50 mg KOH/g polymer.

The amount of modifying agent employed depends on the activity thereof and the requirements imposed in the individual case and is in the range from 0.05 to 30 percent by weight, based on the total amount of rubber microgel employed, and 0.5-10 percent by weight, based on the total amount of rubber gel, is particularly preferred.

The modification reactions can be carried out at temperatures of 0-180° C., preferably 20-95° C., optionally under a pressure of 1-30 bar. The modifications can be carried out on rubber microgels in substance or in the form of their dispersion, it being possible to use inert organic solvents or also water as the reaction medium in the latter case. The modification is particularly preferably carried out in an aqueous dispersion of the crosslinked rubber.

The use of non-modified microgels is preferred in particular in the case of compositions according to the invention which are used for incorporation into non-polar rubbers or non-polar thermoplastic materials, such as, for example, polypropylene, polyethylene and block copolymers based on styrene, butadiene and isoprene (SBR, SIR) and hydrogenated isoprene/styrene block copolymers (SEBS) and conventional TPE-Os and TPE-Vs etc.

The use of modified microgels is preferred in particular in the case of compositions according to the invention which are used for incorporation into polar rubbers or polar thermoplastic materials (A), such as, for example, PA, TPE-A, PU, TPE-U, PC, PET, PBT, POM, PMMA, PVC, ABS, PTFE, PVDF etc.

The average diameter of the microgels prepared can be adjusted with a high degree of accuracy, for example to 0.1 micrometre (100 nm)±0.01 micrometre (10 nm), so that, for example, a particle size distribution in which at least 75% of all the microgel particles are between 0.095 micrometre and 0.105 micrometre in size is achieved. Other average diameters of the microgels, in particular in the range between 5 to 500 nm, can be established with the same accuracy (at least 75 wt. % of all the particles lie around the maximum of the integrated particle size distribution curve (determined by light scattering) in a range of ±10% above and below the maximum) and employed. As a result, the morphology of the microgels dispersed in the composition according to the invention can be adjusted with practically "pinpoint accuracy" and the properties of the composition according to the invention and of the plastics prepared therefrom, for example, can be adjusted.

The microgels prepared in this way, preferably based on BR, SBR, NBR, SNBR or acrylonitrile or ABR, can be worked up, for example, by evaporation, coagulation, by co-coagulation with a further latex polymer, by freeze-coagulation (cf. U.S. Pat. No. 2,187,146) or by spray drying. Commercially available flow aids, such as, for example, $CaCO_3$ or silica, can also be added in the case of working up by spray drying.

In a preferred embodiment of the composition according to the invention, the microgel (B) is based on rubber.

In a preferred embodiment of the composition according to the invention, the microgel (B) is modified by functional groups which are reactive towards C=C double bonds.

In a preferred embodiment, the microgel (B) has a swelling index in toluene at 23° C. of 1 to 15.

The composition according to the invention preferably has a viscosity of 2 mPas up to 50,000,000 mPas, more preferably 50 mPas up to 3,000,000 mPas at a speed of $5\ s^{-1}$, measured with a cone-plate viscometer in accordance with DIN 53018, at 20° C.

Organic Non-Crosslinkable Medium (A).

The composition according to the invention comprises at least one organic medium (A) which has a viscosity at a temperature of 120° C. of less than 30,000 mPas, more preferably less than 1000 mPas, more preferably less than 200 mPas, more preferably less than 100 mPas, even more preferably less than 20 mPas at 120° C.

Such a medium is liquid to solid, preferably liquid or flowable, at room temperature (20° C.).

Organic medium in the context of the invention means that the medium contains at least one carbon atom.

Non-crosslinkable media in the context of the invention are understood as meaning, in particular, those media which contain no groups which can be crosslinked via functional groups containing heteroatoms or C=C groups, such as, in particular, conventional monomers or prepolymers which are crosslinked or polymerized in a conventional manner by means of free radicals, with UV rays, by means of heat and/or by polyaddition or polycondensation with the addition crosslinking agents (e.g. polyisocyanates, polyamines, acid anhydrides) etc., with the formation of oligomers or polymers in the conventional manner. According to the invention, organic, non-crosslinkable media which can be used are also those media which indeed contain, for example, certain contents of unsaturated bonds (certain polyester oils, rapeseed oil etc.) or hydroxyl groups (polyethers), but are not crosslinked or polymerized to form oligomers or polymers in the conventional manner. Non-crosslinkable media are, in particular, also solvents, in particular those according to DIN 55 945.

The non-crosslinkable media (A) are preferably non-crosslinkable media which are liquid at room temperature (20° C.), in particular hydrocarbons (straight-chain, branched, cyclic, saturated, unsaturated and/or aromatic hydrocarbons having 1 to 200 carbon atoms, which can optionally be substituted by one or more substituents chosen from halogens, such as chlorine, fluorine,-hydroxyl, oxo, amino, carboxyl, carbonyl, aceto or amido), synthetic hydrocarbons, polyether oils, ester oils, phosphoric acid esters, silicon-containing oils and halohydrocarbons or halocarbons (see e.g. Ullmanns Enzyklopädie der technischen Chemie, Verlag Chemie Weinheim, volume 20, (1981) 457 et seq., 504, 507 et seq., 517/518, 524). These non-crosslinkable media (A) are distinguished in particular by viscosities of 2 to 1,500 mm$^2$/s (cSt) at 40° C. The non-crosslinkable media (A) are preferably non-crosslinkable media which are liquid at room temperature (20° C.), in particular solvents according to DIN 55 945, such as xylene, solvent naphtha, methyl ethyl ketone, methoxypropyl acetate, N-methylpyrrolidone and dimethylsulfoxide.

The synthetic hydrocarbons are obtained by polymerization of olefins, condensation of olefins or chloroparaffins with aromatics or dechlorinating condensation of chloroparaffins. Examples of the polymer oils are the ethylene polymers, the propylene polymers, the polybutenes, the polymers of higher olefins and the alkylaromatics. The ethylene polymers have molecular weights of between 400 and 2,000 g/mol. The polybutenes have molecular weights of between 300 and 1,500 g/mol.

In the case of the polyether oils, a distinction is made between aliphatic polyether oils, polyalkylene glycols, in particular polyethylene and polypropylene glycols, copolymers thereof, their mono- and diethers and ester-ethers and diesters, tetrahydrofuran polymer oils, perfluoropolyalkyl ethers and polyphenyl ethers. Perfluoropolyalkyl ethers have molecular weights of 1,000-10,000 g/mol. The aliphatic polyether oils have viscosities of 8 to 19,500 mm$^2$/s at 38° C.

Polyphenyl ethers are prepared by condensation of alkali metal phenolates with halobenzenes. Diphenyl ether and its alkyl derivatives are also used.

Examples of the ester oils are the alkyl esters of adipic acid, bis-(2-ethylhexyl) sebacate and bis-(3,5,5-trimethylhexyl) sebacate or adipate as well as the esters of naturally occurring fatty acids with mono- or polyfunctional alcohols, such as TMP oleate. The fluorine-containing ester oils form a further class. In the case of phosphoric acid esters, a distinction is made between triaryl, trialkyl and alkyl aryl phosphates. Examples are tri-(2-ethylhexyl). phosphate and bis-(2-ethylhexyl) phenyl phosphate.

Silicon-containing oils are the silicone oils (polymers of the alkyl- and arylsiloxane series) and the silicates.

Examples of renewable non-crosslinkable organic media are rapeseed oil and sunflower oil.

The halohydrocarbons and halocarbons include chlorinated paraffins, such as chlorotrifluoroethylene polymer oils, and hexafluorobenzene.

(Non-reactive) solvents according to DIN 55 945 are hexane, benzines of specified boiling range, white spirit, xylene, solvent naphtha, balsam turpentine, methyl ethyl ketone, methyl isobutyl ketone, methyl amyl ketone, isophorone, butyl acetate, 1-methoxypropyl acetate, butyl glycol acetate, ethyl diglycol acetate and N-methylpyrrolidone (Brock, Thomas, Groteklaes, Michael, Mischke, Peter, Lehrbuch der Lacktechnologie, Curt R. Vincentz Verlag Hannover, (1998) 93 et seq.).

Particularly preferred non-crosslinkable media include: polyethers, e.g. Baylube 68CL, naphthenic oils e.g. Nynas T 110, paraffinic, highly refined mineral oils e.g. Shell Catenex S 932, ester oils, e.g. Methyl Ester SU, and oils based on renewable raw materials, e.g. refined rapeseed oil. Particularly preferred non-crosslinkable media (A) are the large class of hydrocarbons, the polyether oils and the solvents according to DIN 55 945.

The composition according to the invention preferably contains 0.5 to 90 wt. %, more preferably 1-40 wt. %, even more preferably 2-3-wt. % of the microgel (B), based on the total amount of the composition.

The composition according to the invention furthermore preferably contains 10 to 99.5 wt. %, more preferably 40-97 wt. %, even more preferably 50 to 95 wt. %, furthermore more preferably 60 to 95 wt. % of the organic medium (A).

The composition according to the invention preferably comprises the organic non-crosslinkable medium (A) and the microgel (B) and optionally the further components mentioned below. The presence of water is not preferred, and the compositions according to the invention preferably contain less than 0.8 wt. %, even more preferably less than 0.5 wt. % water. The presence of water is most preferably excluded (<0.1 wt. %). The latter is in general the case in the compositions according to the invention due to the preparation.

The composition according to the invention can additionally comprise fillers, pigments and additives, such as dispersing auxiliaries, deaerators, flow agents, flow promoters, auxiliary substances for wetting the substrate, adhesion promoters, anti-settling agents, auxiliary substances for controlling wetting of the substrate or for controlling the conductivity, auxiliary substances for controlling the stability of the colour shade, the gloss and the floating out, oxidation inhibitors, pour point depressors, high pressure additives, foam prevention agents, demulsifiers, wear protection additives, corrosion protection additives, nonferrous metal deactivators, coefficient of friction modifiers etc.

The additives mentioned can in particular be incorporated here particularly uniformly into the compositions according to the invention, which in turn leads to improvement in the product prepared therefrom, such as polymer compositions, lubricants etc.

Particularly suitable pigments and fillers for the preparation of the compositions according to the invention which comprise the non-crosslinkable medium (A), and microgel-containing plastics prepared therefrom are, for example: inorganic and organic pigments, silicatic fillers, such as kaolin, talc, carbonates, such as calcium carbonate and dolomite, barium sulfate, metal oxides, such as zinc oxide, calcium oxide, magnesium oxide and aluminium oxide, highly disperse silicas (precipitated and thermally prepared silicas), metal hydroxides, such as aluminium hydroxide and magnesium hydroxide, glass fibres and glass fibre products (slats, strands or glass microbeads), carbon fibres, thermoplastic -fibres (polyamide, polyester or aramid), rubber gels based on polychloroprene and/or polybutadiene or also all other gel particles described previously which have a high degree of crosslinking and a particle size of 5 to 1,000 nm.

The fillers mentioned can be employed by themselves or in a mixture. In a particularly preferred embodiment of the process, 0.5-3.0 parts by weight of rubber gel (B), optionally together with 0.1 to 40 parts by weight of fillers, and 30-99.5 parts by weight of the liquid non-crosslinkable medium (A) are employed for the preparation of the compositions according to the invention.

The compositions according to the invention can comprise further auxiliary substances, such as anti-ageing agents, heat stabilizers, light stabilizers, ozone protection agents, processing auxiliaries, plasticizers, tackifiers, blowing agents, dyestuffs, waxes, extenders, organic acids and filler activators, such as, for example, trimethoxysilane, polyethylene glycol or others which are known in the industries described.

The auxiliary substances are employed in the conventional amounts, which depend, inter alia, on the intended use. Conventional amounts are e.g. amounts of 0.1 to 50 wt. %, based on the amounts of liquid medium (A) employed and of rubber gel (B) employed.

In a preferred embodiment, the composition according to the invention is prepared by mixing at least one non-crosslinkable organic medium (A) which has a viscosity of less than 30,000 mPas at a temperature of 120° C. and at least one dry microgel powder (B) (preferably less than 1 wt. %, even more preferably less than 0.5 wt. % of volatile contents (no microgel latices are used during mixing of components (A) and (B)) which is not crosslinked by high-energy radiation, by means of a homogenizer, a bead mill, a triple-roll mill, a single- or multiple-screw extruder, a kneader and/or a dissolver, preferably by means of a homogenizer, a bead mill or a triple-roll mill.

In respect of the viscosity of the composition to be prepared, the kneader, in which preferably only very highly viscous (almost solid to solid) compositions can be employed, is the most limited, i.e. it can be used only in special cases.

Disadvantages of the bead mill are the comparatively limited viscosity range (tending towards thin compositions), high outlay on cleaning, expensive product change of the compositions which can be used as well as the abrasion of the balls and grinding apparatus.

The homogenization of the compositions according to the invention is particularly preferably carried out by means of a homogenizer or a triple-roll mill. Disadvantages of the triple-roll mill are the comparatively limited viscosity range (tending towards very thick compositions), low throughput and non-closed working procedure (poor work safety). The homogenization of the compositions according to the invention is therefore very preferably carried out by means of a homogenizer. The homogenizer allows thin and thick compositions to be processed at a high throughput (high flexibility). Product changes can be undertaken comparatively quickly and without problems.

It is surprising and novel that the microgels (B) can be dispersed in non-crosslinkable organic media; the dispersing which has been successful down to the primary particles is particularly surprising (see examples).

The dispersing of the microgels (B) in the liquid medium (A) is carried out in the homogenizer in the homogenizing valve (see FIG. 3).

In the process which is preferably employed according to the invention, agglomerates are divided into aggregates and/or primary particles. Agglomerates are units which can be separated physically, during dispersion of which no change in the primary particle size takes place.

The product to be homogenized enters the homogenizing valve at a slow speed and is accelerated to high speeds in the homogenizing gap. The dispersing takes place after the gap, chiefly on the basis of turbulences and cavitation (William D. Pandolfe, Peder Baekgaard, Marketing Bulletin of APV Homogeniser Group—"High-pressure homogenisers processes, product and applications").

The temperature of the composition according to the invention on introduction into the homogenizer is expediently −40-140° C., preferably 20-80° C.

The composition according to the invention to be homogenized is expediently homogenized in the apparatus under a pressure of 20 to 4,000 bar, preferably 100 to 4,000 bar, preferably 200 to 4,000 bar, preferably 200-2,000 bar, very preferably 500-1,500 bar. The number of passes depends on the desired dispersing quality and can vary between one and 20, preferably one to 10, more preferably one to four passes.

The compositions prepared according to the invention have a particularly fine particle distribution, which is achieved in particular with the homogenizer, which is also extremely advantageous in respect of the flexibility of the process with respect to varying viscosities of the liquid media and of the resulting compositions and the temperatures necessary as well as the dispersing quality.

The invention furthermore relates to the use of the composition according to the invention for the preparation of microgel-containing polymers and plastics, as explained above.

If the compositions according to the invention are incorporated into thermoplastic polymers, it is found, completely surprisingly, that microgel-containing polymers which behave like thermoplastic elastomers are obtained.

The invention furthermore also relates to the shaped articles and coatings produced therefrom by conventional processes.

The invention is explained in more detail with reference to the following examples. The invention is of course not limited to these examples.

EXAMPLES

Example 1

SBR Gel in Nynas T110

In Example 1 described in the following, it is shown that compositions according to the invention which display particular rheological characteristics, such as structural viscosity, thixotropy and approximately Newtonian flow properties, are obtained using microgels based on SBR.

The use of the composition according to the invention as a functional and/or rheological additive, inter alia, emerges from this. Microgels which have little influence on the viscosity, that is to say in a first approximation show Newtonian flow properties, have favourable prerequisites for the use of the mixtures according to the invention in rubber or plastic. Microgels which greatly influence the viscosity, that is to say show structural viscosity or thixotropy flow properties, are suitable in particular for use of the mixtures according to the invention in greases.

The composition is shown in the following table:

| | |
|---|---|
| 1. Nynas T 110 | 80% |
| 2. Micromorph 1P or 5P | 20% |
| Total | 100% |

Nynas T 110 is a hydrogenated naphthenic oil from Nynas Naphthenics AB.

Micromorph 5P is a crosslinked rubber gel having an OH number of 4 based on SBR from RheinChemie Rheinau GmbH. Micromorph 5P comprises 40 wt. % styrene, 57.5 wt. % butadiene and 2.5 wt. % dicumyl peroxide.

Micromorph 1P is a crosslinked, surface-modified rubber gel based on SBR from RheinChemie Rheinau GmbH. Micromorph 1P comprises 80 wt. % styrene, 12 wt. % butadiene, 5 wt. % ethylene glycol dimethacrylate (EGDMA) and 3 wt. % hydroxyethyl methacrylate (HEMA).

The characteristic data of the SBR gels are summarized in Table 1.

TABLE 1

Properties of the microgels Micromorph 1P and 5P.

| Product | Gel type | $D_{50}$ [nm] | Tg [° C.] | Gel content [wt. %] | OH number [mg KOH/$g_{pol.}$] | Acid number |
|---|---|---|---|---|---|---|
| Micromorph 1P | SBR | 69 | 56 | 96 | 41 | 0.4 |
| Micromorph 5P | SBR | 50 | none | 92 | 4 | 0.7 |

The abbreviations in the table have the following meanings:

DCP: Dicumyl Peroxide $d_{50}$: The diameter $\bar{d}_{50}$ is defined according to DIN 53 206 as the mean. In this case it is the average particle diameter of the particles in the latex. The particle diameter of the latex particles was determined here by means of ultracentrifugation (W. Scholtan, H. Lange, "Bestimmung der Teilchengrößenverteilung von Latices mit der Ultrazentrifuge", Kolloid-Zeitschrift und Zeitschrift für Polymere (1972) volume 250, issue 8). The diameter values in the latex and for the primary particles in the compositions according to the invention are practically the same, since the particle size of the microgel particles does not change during the preparation of the composition according to the invention.

Tg: Glass Transition Temperature

For the determination of Tg and ΔTg, the DSC-2 apparatus from Perkin-Elmer is used.

Swelling Index QI

The swelling index QI was determined as follows:

The swelling index is calculated from the weight of the solvent-containing microgel swollen in toluene at 23° for 24 hours and the weight of the dry microgel:

$Qi$=wet weight of the microgel/dry weight of the microgel.

To determine the swelling index, 250 mg of the microgel are swollen in 25 ml toluene for 24 h, while shaking. The (wet) gel swollen with toluene is weighed, after centrifugation at 20,000 rpm, and then dried to constant weight at 70° C. and weighed again.

OH Number (Hydroxyl Number)

The OH number (hydroxyl number) is determined in accordance with DIN 53240 and corresponds to the amount of KOH in mg which is equivalent to the amount of acetic acid which is liberated during acetylation of 1 g of substance with acetic anhydride.

Acid Nnumber

The acid number is determined in accordance with DIN 53402 as already mentioned above and corresponds to the amount of KOH in mg which is necessary to neutralize one g of the polymer.

Gel Content

The gel content corresponds to the content which is insoluble in toluene at 23° C. The gel content is given by the quotient of the dried residue and the amount weighed out and is stated in percent by weight.

Preparation Example 1 for Micromorph 1P

Micromorph 1P is a microgel based on hydroxyl-modified SBR, prepared by direct emulsion polymerization using the crosslinking comonomer ethylene glycol dimethacrylate.

325 g of the Na salt bf a long-chain alkylsulfonic acid (330 g Mersolat K30/95 from Bayer AG) and 235 g of the Na salt of methylene-bridged naphthalenesulfonic acid (Baykanol PQ from Bayer AG) are dissolved in 18.71 kg water and the solution is initially introduced into a 40 l autoclave. The autoclave is evacuated and charged with nitrogen 3 times. Thereafter, 8.82 kg styrene, 1.32 kg butadiene, 503 g ethylene glycol dimethacrylate (90% pure), 314 g hydroxyethyl methacrylate (96%) and 0.75 g hydroquinone monomethyl ether are added. The reaction mixture is heated up to 30° C., while stirring. An aqueous solution consisting of 170 g water, 1.69 g ethylenediaminetetraacetic acid (Merck-Schuchardt), 1.35 g iron(II) sulfate*$7H_2O$, 3.47 g Rongalit C (Merck-Schuchardt) and 5.24 g trisodium phosphate*$12H_2O$ is then metered in. The reaction is started by addition of an aqueous solution of 2.8 g p-menthane hydroperoxide (Trigonox NT 50 from Akzo-Degussa) and 10.53 g Mersolat K 30/95, dissolved in 250 g water. After a reaction time of 5 hours, the mixture is post-activated with an aqueous solution consisting of 250 g water, in which 10.53 g Mersolat K30/95 and 2.8 g p-menthane hydroperoxide (Trigonox NT 50) are dissolved. When a polymerization conversion of 95-99% is reached, the polymerization is stopped by addition of an aqueous solution of 25.53 g diethylhydroxylamine, dissolved in 500 g water. Thereafter, unreacted monomers are removed from the latex by stripping with steam. The latex is filtered and, as in Example 2 of U.S. Pat. No. 6,399,706, stabilizer is added and the product is coagulated and dried.

Micromorph 5P is prepared analogously. The dry microgel powders Micromorph 1P and Micromorph 5P further processed according to the invention were obtained from the latex by spray drying.

For the preparation of the composition according to the invention, Nynas T 110 was initially introduced into the preparation vessel and Micromorph 5P was added, while stirring by means of a dissolver. The composition was passed through the homogenizer four times under 950 bar.

The laboratory high-pressure homogenizer APV1000 from Invensys was used as the homogenizer.

The rheological properties of the composition were determined with a rheometer, MCR300, from Physica. A plate-cone system, CP25-1, was used as the measuring body. The measurements were carried out at 20° C.

Some measurement results for the composition of 80% Nynas T 110 and 20% Micromorph 1P and Micromorph 5P are shown in the following Table 2.

The greases Li-12OH, a semi-finished product, and E301 (15%), a laboratory product from RheinChemie Rheinau GmbH, were also measured as a comparison.

The viscosities η, which were measured at shear rates v' of 5 $s^{-1}$, 100 $s^{-1}$, 1,000 $s^{-1}$, 3,000 $s^{-1}$ and 0,1 $s^{-1}$, are shown in the table. The measurement was carried out with a measurement programme in which the measurement values (dynamic viscosities η etc.) were recorded in the sequence given above. The quotient η (v'=0.1 $s^{-1}$)/η (v'=3,000 $s^{-1}$) was defined as an arbitrary measure of the viscosity-increasing action of the microgel.

The composition of 80% Nynas T 110 and 20% Micromorph 5P, which was passed through the homogenizer four times under 950 bar, shows rheological properties comparable to those of Li-120H AK33 or E301, i.e. Micromorph 5P is suitable as a raw material for the preparation of greases.

The values in Table 2 show very clearly what diverse rheological properties can be achieved with the microgels.

TABLE 2

Rheological characterization of Mikromorph 1P and 5P
(in each case 20 wt. %) in Nynas T 110; 20° C.; cone-plate: CP 25-1.

| Name | Characteristics | $\eta$ v' = 5 s$^{-1}$ [Pas] | $\eta$ v' = 100 s$^{-1}$ [Pas] | $\eta$ v' = 1,000 s$^{-1}$ [Pas] | $\eta$ v' = 3,000 s$^{-1}$ [Pas] | $\eta$ v' = 0.1 s$^{-1}$ [Pas] | $\eta$ (v' = 0.1 s$^{-1}$)/ $\eta$ (v' = 3,000 s$^{-1}$) [ ] | Comments |
|---|---|---|---|---|---|---|---|---|
| Li-120H | 0.0935 s$^{-1}$ instead of 0.1 s$^{-1}$ | 375 | 23.3 | 3.9 | — | 7,950 | 2,023[3] | Example grease without additive (semi-finished product) structural viscosity, not very thixotropic |
| E301 (15%) | 0.15 s$^{-1}$ instead of 0.1 s$^{-1}$ | 83 | 14.6 | 6.6 | — | 2,420 | 368[3] | Example grease without additive; structural viscosity in mineral oil |
| AE25648/5[1] | M. 1P/ 0 × 950 bar | 23.4 | 5.1 | 3.45 | 2.3 | 1350 | 391 | |
| AE25648/5[1] | M. 1P/ 1 × 950 bar | 1.81 | 1.42 | 1.24 | 1.11 | 5.9 | 5 | almost Newtonian flow properties |
| AE25648/5[1] | M. 1P/ 2 × 950 bar | 2.3 | 1.77 | 1.34 | 1.20 | 1.99 | 1.5 | almost Newtonian flow properties |
| AE25648/5[1] | M. 1P/ 3 × 950 bar | 3.9 | 2.01 | 1.42 | 1.25 | 1.72 | 1.2 | slightly thixotropic |
| AE25648/5[1] | M. 1P/ 4 × 950 bar | 9.3 | 2.80 | 1.71 | 1.46 | 3.3 | 2 | thixotropic |
| AE25648/6[2] | M. 5P/ 0 × 950 bar | 6.8 | 1.94 | 1.56 | 1.38 | 2.02 | 1.3 | |
| AE25648/6[2] | M. 5P/ 1 × 950 bar | 11.9 | 5.4 | 3.8 | 2.44 | 2150 | 563 | structural viscosity |
| AE25648/6[2] | M. 5P/ 2 × 950 bar | 19.6 | 6.0 | 3.6 | 2.34 | 1750 | 489 | structural viscosity |
| AE25648/6[2] | M. 5P/ 3 × 950 bar | 33 | 6.8 | 3.6 | 2.36 | 1580 | 444 | structural viscosity |
| AE25648/6[2] | M. 5P/ 4 × 950 bar | 57 | 7.7 | 3.6 | 2.40 | 1720 | 475 | structural viscosity, not very thixotropic |

[1] 20 wt.% Micromorph 5P in Nynas T 110
[2] 20 wt.% Micromorph 5P in Nynas T 110
[3] $\eta$(v' = 0.1 s$^{-1}$)/$\eta$v' = 1,000 s$^{-1}$)

The values measured show a thickening which, with suitable choice of the microgel/lubricant combination from the point of view of rheology, surprisingly allows the preparation of lubricating greases.

Moreover, rheological properties can be controlled with microgels in the liquid media described. The compositions according to the invention are of particular interest as thickeners, as agents for preventing running and settling out and as a rheological additive.

The compositions described or similar compositions can advantageously be used in lubricating greases, lacquers and paints, adhesives, rubber, plastics and gel coats or thermoplastic elastomers.

The compositions prepared in Example 1 can be used particularly advantageously in lubricating greases. In these, they lead to particularly favourable properties, such as a high thixotropy or structural viscosity.

Further very advantageous properties which are co-introduced into the particular systems via the microgels can be seen from the following examples.

Example 2

Transparency and Phase Separation as well as Rheological and Tribological Properties of the Lubricants From the Combination of 2% Microgel—Lubricating Oil In Example 2 described in the following, it is shown that compositions according to the invention which display particular characteristics in respect of transparency and stability towards separation are obtained using microgels based on SBR and NBR.

The composition is shown in the following table:

| 1. Lubricating oil | 98% |
|---|---|
| 2. Microgel | 2% |
| Total | 100% |

Shell Catenex S 932 is a paraffinic, highly refined mineral oil from Deutsche Shell GmbH.

Shell Gravex 921 is a hydrogenated, naphthene-based manufactured oil from Shell&DEA Oil GmbH.

Methyl Ester SU is a methyl ester (Radia 7961) from Oleon NV.

Silicone Oil M350 is a polydimethylsiloxane from Bayer MaterialScience AG.

Baylube 68CL is a polyether from RheinChemie Rheinau GmbH.

The microgels OBR 1210 and OBR 1212 are crosslinked, surface-modified rubber gels based on SBR from RheinChemie Rheinau GmbH. Micromorph 4P is a crosslinked rubber gel which is not surface-modified and is based on SBR, from RheinChemie Rheinau GmbH.

OBR 1310D is a crosslinked, surface-modified rubber gel based on NBR (Tab. 3). The microgels are prepared by a procedure analogous to that described in Example 1 for Micromorph 1P.

TABLE 3

Composition of the microgels OBR 1210, OBR 1212, OBR 1310D and Micromorph 4P.

| Name | Acrylonitrile | Butadiene | Styrene | TMP TMA | HEMA | Comments |
|---|---|---|---|---|---|---|
| OBR 1210 | 0 | 51.6 | 34.4 | 12.5 | 1.5 | — |
| OBR 1212 | 0 | 46.5 | 31 | 12.5 | 10 | — |
| OBR 1310D | 23.8 | 61.2 | 0 | 5 | 10 | — |
| Micromorph 4P | | | | | | As Micromorph 5P; but 1.5 DCP[1)] |

The characteristic data of the SBR gels and of the NBR gel are summarized in Table 4.

TABLE 4

Properties of OBR 1210, OBR 1212, OBR 1310D and Micromorph 4P.

Analytical data

| Microgel | Gel type | $D_{50}$ [nm] | $SA_{spec.}$ [m²/g] | Particle density [g/ml] | Tg [° C.] | Gel [wt. %] | QI | OH number [mg KOH/g] | Acid number | Tg level DSC/ 2nd htg up [° C.] |
|---|---|---|---|---|---|---|---|---|---|---|
| OBR 1210 | SBR | 60 | 102 | 0.993 | −20.0 | 95.4 | 4.9 | 4 | 1.1 | — |
| OBR 1212 | SBR | 55 | 107 | 1.017 | −5.0 | 99.2 | 4.4 | 42 | 1.7 | — |
| OBR 1310D | NBR | 78 | 80 | 0.992 | −25.0 | 99.4 | 4.9 | 32 | 1.3 | 11.0 |
| Micromorph 4P | SBR | 57 | 111 | — | −15.0 | 94.6 | 9.0 | 8 | 6 | — |

The abbreviations in the table have the following meanings:

$SA_{spec.}$: specific surface area in m²/g

Glass Transition Range:

The glass transition range was determined as described above. Otherwise see Example 1.

Control of the Homogeneity:

The samples were tested visually for separation one week after the preparation.

Control of the Transparency:

The transparency of the samples was checked visually. Samples which showed separation or flocculation were stirred up before the evaluation.

Preparation of the Compositions According to the Invention

For the preparation of the composition according to the invention, the particular lubricating oils were initially introduced into the preparation vessel and the particular microgel was added, while stirring by means of a dissolver. The mixture was left to stand for at least one day, and then further processed with the homogenizer. The composition according to the invention was introduced into the homogenizer at room temperature and passed through the homogenizer six times in batch operation under 900 to 1,000 bar. During the first pass the microgel paste heats up to approx. 40° C., and during the second pass to approx. 70° C. Thereafter, the microgel paste was cooled down to room temperature by being left to stand, and the operation was repeated until six passes had been achieved.

The rheological properties of the composition were determined with a rheometer, MCR300, from Physica. A plate-cone system, CP 50-2, was used as the measuring body. The measurements were carried out at 40° C.

Some measurement results for the microgels described above are shown in the following Table 5 to 7.

TABLE 5

Clouding and separation of the microgel-containing lubricating oils (2% microgel): room temperature.

| Lubricating oil | Microgel | Dispersing | Clouding | Phase separation |
|---|---|---|---|---|
| Shell Catenex S932 | OBR 1212 | 6 x | milky-cloudy | no settling |
| | OBR 1310D | 6 x | moderately transparent | severe settling |
| | Micromorph 4P | 6 x | milky-cloudy | severe settling |
| Shell Gravex 921 | OBR 1210 | 6 x | milky-cloudy | severe settling |
| | OBR 1310D | 6 x | cloudy/moderately transp. | severe settling |
| | Micromorph 4P | 6 x | milky-cloudy | no settling |
| Methyl Ester SU | OBR 1210 | 6 x | very weakly transparent | no settling |
| | OBR 1212 | 6 x | milky-cloudy | no settling |
| | OBR 1310D | 6 x | milky-cloudy | moderate settling |
| | Micromorph 4P | 6 x | milky-cloudy | no settling |
| Silicone Oil | OBR 1210 | 6 x | milky- | no settling |

TABLE 5-continued

Clouding and separation of the microgel-containing lubricating oils (2% microgel): room temperature.

| Lubricating oil | Microgel | Dispersing | Clouding | Phase separation |
|---|---|---|---|---|
| M350 | | | cloudy | |
| | OBR 1310D | 6 x | milky-cloudy | severe settling |
| | Micromorph 4P | 6 x | milky-cloudy | no settling |

From Tab. 5 it can be seen that there are many compositions according to the invention which on the one hand are based on different lubricating oils and on the other hand do not settle out. In particular, Micromorph 4P shows no settling out in any combination. This is surprising, since only 2 wt. % microgel was added.

Furthermore, a composition which is largely transparent and does not separate, namely OBR 1210 in Methyl Ester SU, was found.

TABLE 6

Rheological characterization of the microgel-containing lubricating oils; 40° C.; cone-plate: measurement system CP 50-2.

| Binder | Microgel | Homogenization | Vis. (40° C.; 5 s$^{-1}$) [mPas] | Vis. (40° C.; 1,000 s$^{-1}$) [mPas] | Vis. (40° C.; 3,000 s$^{-1}$) [mPas] | Quotient Vis.(5s$^{-1}$)/ Vis. (3,000 s$^{-1}$) [mPas] |
|---|---|---|---|---|---|---|
| Methyl Ester SU | — | 0x | 1.83 | 3.9 | 5.3 | 0.35 |
| Methyl Ester SU | OBR1310D (2%) | 6x | 23.8 | 5.9 | 6.4 | 3.7 |
| Methyl Ester SU | Micromorph 4P (2%) | 6x | 83.8 | 9.5 | 8.3 | 10. |
| Shell Catenex S932 | — | 0x | 55 | 54 | 53 | 1.0 |
| Shell Catenex S932 | 0BR1212 (2%) | 6x | 107 | 64 | 60 | 1.8 |
| Shell Gravex 921 | — | 0x | 19.8 | 21 | 21 | 0.9 |
| Shell Gravex 921 | Micromorph 4P (2%) | 6x | 118 | 34 | 30 | 4.0 |
| Silicone Oil M350 | BR1210 (2%) | 6x | 269 | 244 | 238 | 1.1 |

From the values of Table 6, the rheological action of the microgels even at a concentration of two percent can be clearly seen; nevertheless, there is a clear differentiation into Newtonian, structural viscosity and thixotropic flow properties. OBR 1210 has Newtonian flow properties in Silicone Oil M350.

SRV tests were furthermore carried out for determination of the coefficient of friction (Tab. 7; FIGS. 2a and 2b). The SRV tests were carried out by the method of ASTM 5706-97, a ring-plate geometry being chosen instead of a ball-plate geometry:

100 CR 6 steel ring lapped on 100 CR 6 steel plate

| Frequency: | 50 Hz |
|---|---|
| Load: | 300 N (vary as required) |
| Temperature: | 100° C. |
| Amplitude: | 1.500 mm |
| Duration: | 60 minutes |

TABLE 7

SRV test on the combinations of 2 wt. % microgel (OBR 1210) - lubricating oil (Baylube 68CL) and of Baylube 68CL for comparison; ring-plate.

| Load: 300 N 100CR6 steel ring/ 100CR6 steel plate, lapped | Coefficient of friction min | Coefficient of friction max | Wear of plate | Appearance of the friction site |
|---|---|---|---|---|
| 68CL-1210 | 0.025μ | 0.087μ | cannot be measured | metallic blank |
| Baylube 68CL as a reference | 0.044μ | 0.081 | cannot be measured | metallic blank |

It can be seen from Table 7 that for the composition according to the invention, OBR 1210/Baylube 68CL, a clearly lower coefficient of friction is found compared with the pure lubricating oil Baylube 68CL. It is moreover found that the course of the curve during measurement is smoother, which indicates that the microgels lead to a lower wear on the surface of the test plate.

The microgel, like many other microgels also, surprisingly has properties which reduce the coefficient of friction and can therefore be employed as a coefficient of friction modifier.

Example 3

Phase Separation and Rheological and Tribological Properties of the Lubricants from the Combination of 10%, 15%, 20% and 30% Microgel—Lubricating Oil In Example 3 described in the following, it is shown that compositions according to the invention which display particular characteristics in respect of transparency and stability in respect of separation can be obtained using microgels based on SBR and NBR. It is furthermore found that lubricating greases can be obtained.

The composition of the microgel paste is shown in the following table:

| 1. Lubricating oil | 90%, 85%, 80%, 70% |
|---|---|
| 2. Microgel | 10%, 15%, 20%, 30% |
| Total | 100% |

Shell Catenex S 932 is a paraffinic, highly refined mineral oil from Deutsche Shell GmbH.

Methyl Ester SU is a methyl ester (Radia 7961) from Oleon NV.

Refined rapeseed oil is an oil from Cereol Deutschland GmbH, which is obtained from renewable raw materials.

Baylube 68CL is a polyether from RheinChemie Rheinau GmbH.

Nynas T 110 is a hydrogenated naphthenic oil from Nynas Naphthenics AB.

The microgels OBR 1210 and OBR 1212 are crosslinked, surface-modified rubber gels based on SBR from RheinChemie Rheinau GmbH. OBR 1135 and Micromorph 5P are crosslinked rubber gels which are not surface-modified and are based on BR and SBR respectively, from RheinChemie Rheinau GmbH.

Micromorph 5P is described in Example 1. The compositions of the microgels OBR 1210 and OBR 1212 are described in Example 2. OBR 1135 is a BR gel; it comprises 97.5% and 2.5% dicumyl peroxide. The microgels are prepared as described in Example 1 for Micromorph 1P.

The greases Li-120H, a semi-finished product, and E301 (15%) and M10411, laboratory products from RheinChemie Rheinau GmbH, were also measured as a comparison.

The characteristic data of the microgels are summarized in Examples 1 and 2.

Preparation of the Compositions According to the Invention

The composition according to the invention was prepared as already described above. In deviation from this, an air pressure of 1 to 5 bar was required in certain cases to convey the material into the homogenizer. The number of passes is stated in the following.

The rheological properties of the composition were determined with a rheometer, MCR300, from Physica. A plate-cone system, CP 25-1, was used as the measuring body. The measurements were carried out at 20° C.

Some measurement results for the microgels described above are shown in the following (Tab. 8-10):

20 and 30% Micromorph 5P/Nynas T110 exude little lubricating oil and are solid.

Only 30% OBR 1135 and OBR 1210/Nynas T110 exude little lubricating oil and are solid.

20% OBR 1135/rapeseed oil and 20Micromorph 5P/rapeseed oil also show no separation on the surface, even after 1.5 years. Hardly any separation is also shown with 10% of the same gels in rapeseed oil.

TABLE 8

Rheological characterization of the microgel-containing lubricating greases; 20° C.; cone-plate: measurement system CP 25-1.

| Lubricating oil | Microgel | Homogen-ization | Vis. (20° C.; 5 s$^{-1}$) [Pas] | Vis. (20° C.; 100 s$^{-1}$) [Pas] | Vis. (20° C.; 1,000 s$^{-1}$) [Pas] | Quotient Vis.(5s$^{-1}$)/ Vis.(1,000 s$^{-1}$) [ ] |
|---|---|---|---|---|---|---|
| Baylube 68CL | OBR1210 (30%) | 6x | 172 | 20.4 | 5.7 | 30 |
| Shell Catenex S932 | OBR1212 (30%) | 6x | 22.6 | 4.2 | 1.4 | 16 |

The drop point, penetration and oil separation capacity were measured by the method of or in accordance with the particular standards:

DIN 51801: Drop Point:

The drop point describes that temperature at which the first drop emerges from the material to be determined and touches the base of the drop vessel.

DIN 51580: Penetration:

Penetration is understood as meaning the measurement of the consistency of paste-like or waxy-solid materials by means of penetration of a conical cone shell into the sample. The penetration depth in ¹/₁₀ mm is stated as the penetration value P.

On an untreated sample: Pu

On a milled sample: Pm,60 (after 60 strokes) or Pm,100,000 (after 100,000 strokes)

DIN 51817: Oil Separation:

The oil separation is a measure of the stability of the grease matrix of thickener and base liquid. The sample is weighted with a weight, for example, at 40° C. for a certain time. By this means, base liquid emerges from the grease matrix during the loading. The percentage content of base liquid after the loading time at the given temperature is determined.

TABLE 9

Physical properties of the combinations of 30% microgel (Micromorph 5P, OBR 1135, OBR 1210) - lubricating oil (Baylube 68CL, Methyl Ester SU, Nynas T 110, Shell Catenex S932) and of PU grease M10411 and Lithium 12OH grease for comparison. Drop point, resting and milling penetration.

| | Drop point (DIN 51801) [° C.] | Penetration Pu/Pm 60 (DIN 51580) [1/10 mm] | Penetration Pm, 60.000 [1/10 mm] |
|---|---|---|---|
| Li-12OH grease | 186 | 188/190 | 241 |
| Methyl Ester SU- Micromorph 5P (30%) | 177 | 215/214 | 249 |
| Baylube 68CL- OBR1210 (30%) | 174/137 | 238/247 | 238 |
| Nynas T110 - OBR 1135 (30%) | >280 | 180/191 | 196 |
| Nynas T110 - PU grease M 10411 (12%) | | 190/213 | 320 |

The oil separation capacity (18 h/40° C.) is the same for the composition according to the invention of Nynas T110-OBR 1135 (30%) and the lithium grease Li-12OH grease: 0.29% Low $P_u$ and high $P_{m, 60,000}$ values are typical of greases. This is confirmed by the measurements on the lithium 12 grease and the PU grease, as can be seen from Tab. 9.

The microgel-lubricating oil combinations show little or no differences in the values for the resting penetration $P_u$ and the milling penetration $P_{m, 60,000}$. Thus, the OBR 1210-Baylube 68CL combination in particular is stable to shearing forces.

TABLE 10

SRV test on the combinations of 30% microgel (Micromorph 5P, OBR 1210) - lubricating oil (Baylube 68CL, Methyl Ester SU, Shell Catenex S932) and of PU grease M10411 and lithium 12 grease for comparison.

| Load: 300 N 100CR6 steel ring/100CR6 steel plate, lapped | Coefficient of friction min [µm] | Coefficient of friction max [µm] | Wear of plate [µm] | Appearance of the friction site |
|---|---|---|---|---|
| Li—12OH grease without add. Fuchs (P 1031) | 0.020 | 0.230 | 2.84 | metal. blank, surrounding area with much black abrasion |
| Methyl Ester SU - Micromorph 5P (30%) | 0.095 | 0.295 | 2.07 | metal. blank, surrounding area black with furrows |
| Baylube 68CL - OBR1210 (30%) | 0.045 | 0.080 | cannot be measured | metal. blank, surrounding area without deposits |
| PU grease M 10411 (12%) in Nynas T110 | 0.075 | >0.40 | 5.92 | friction site has eaten away spots and tribocorrosion surrounding area heavy black deposits |

The course of the SRV curves shows the following: In contrast to the comparison greases, the OBR 1210 grease shows a smooth course of the curve, which ends at the lower level of the coefficient of friction, and a metallic blank friction site.

TABLE 11

Wear tests on the combinations of 30% microgel (Micromorph 5P, OBR 1210) - lubricating oil (Baylube 68CL, Methyl Ester SU, Shell Catenex S932) and of PU grease M10411 and lithium 12 grease for comparison.

| | FBA shock load (by the method of DIN 51350; DIN balls) 1,000 N, 1,420 rpm, 1 min | FBA goods/weld load (DIN 51350, part 4) 1,420 rpm, 1 min |
|---|---|---|
| Li-12OH grease without add. Fuchs (P 1031) | 2.60 mm | +1,400/−1,500 N |
| Methyl Ester SU - Micromorph 5P (30%) | 1.75 mm | +1,800/−1,900 N |
| Baylube 680L - OBR1210 (30%) | 0.78 mm | +1,800/−1,900 N |
| PU grease M 10411 (12%) in Nynas T110 | 3.50 mm | <1,400 N |

Table 11 shows that the shock load and FBA goods/weld load are improved significantly according to the invention.

Example 3 shows that the compositions according to the invention having a relatively high content of microgel (15-30%) surprisingly show properties comparable to those of commercial greases (stability towards settling out, low separation of oil, consistency etc.) but more favourable properties (high shear stability, i.e. almost no change in the penetration values after milling with 60,000 strokes) and exceptionally high drop points such as are otherwise achieved only by heat-resistant greases, such as e.g. Pu greases or Ca complex greases. Furthermore these compositions display a positive action on coefficients of friction, which is completely untypical of standard greases.

Example 4

SBR Gel OBR 1312B, Modified by Hydroxyl Groups, in Baylube 68CL

In Example 4 described below, it is shown that, using microgels based on SBR which are modified by hydroxyl groups, compositions according to the invention which chiefly contain primary particles having an average particle diameter of approx. 43 nm can be prepared in a homogenizer by applying 900 to 1,000 bar with 2 to 6 passes.

The composition is shown in the following table:

| 1. | Baylube 68CL | 97.8 |
|---|---|---|
| 2. | OBR 1312B | 2.0 |
| 3. | Dispersing auxiliary | 0.2 |
| | Total | 100.0 |

Baylube 68CL is a polyether from RheinChemie Rheinau GmbH.

The microgel OBR 1312B is a crosslinked, surface-modified rubber gel based on SBR from RheinChemie Rheinau GmbH (Tab. 12). The microgel is prepared analogously to Example 1 for Micromorph 1P.

TABLE 12

Composition of the microgel OBR 1312B.

| Name | Acrylonitrile | Butadiene | Styrene | TMPTMA | HEMA | Comments |
|---|---|---|---|---|---|---|
| OBR 1312B | 0 | 46 | 42.5 | 1.5 | 10 | — |

The characteristic data of OBR 1312B are summarized in Table 13.

TABLE 13

Properties of OBR 1312B.

Analytical data

| Microgel | Gel type | $d_{50}$ [nm] | $SA_{spec}$ [m²/g] | Particle density [g/ml] | Tg [°C] | Gel [wt. %] | QI | OH number [mg KOH/g] | Acid number | Tg level DSC/ 2nd htg up [°C] |
|---|---|---|---|---|---|---|---|---|---|---|
| OBR 1312B | SBR | 43 | 141 | 0.996 | — 21.5 | 99.9 | 9.7 | 44 | 1.3 | — |

For the preparation of the composition according to the invention, Baylube 68CL was initially introduced into the preparation vessel and OBR 1312B was added, while stirring by means of a dissolver. The mixture was left to stand for at least one day, and then further processed with the homogenizer.

The composition according to the invention was introduced into the homogenizer at room temperature and passed through the homogenizer 6 times under 960 bar in batch operation. During the first pass the microgel paste heats up to approx. 40° C., and during the second pass to approx. 70° C. Thereafter, the microgel paste was cooled to room temperature and dispersed a third and fourth time. This was repeated until six passes had been achieved.

The particle diameter of the latex particles was -determined by means of ultracentrifugation (W. Scholtan, H. Lange, "Bestimmung der Teilchengrößenverteilung von Latices mit der Ultrazentrifuge", Kolloid-Zeitschrift und Zeitschrift für Polymere (1972) volume 250, issue 8).

BRIEF DESCRIPTION OF THE DRAWINGS

As shown in FIGS. 1 and 2, there can be seen, surprisingly, almost the entire amount of the dried and therefore agglomerated OBR powder has been successfully redispersed down to the primary particles, the average particle diameter of the redispersed mixture even being below the average particle diameter of the original latex. It is to be noted in addition that the measurement was carried out on a redispersed sample which had been stored for 6 months at room temperature, i.e. the dispersion surprisingly remained stable for 6 months.

Figure 1:
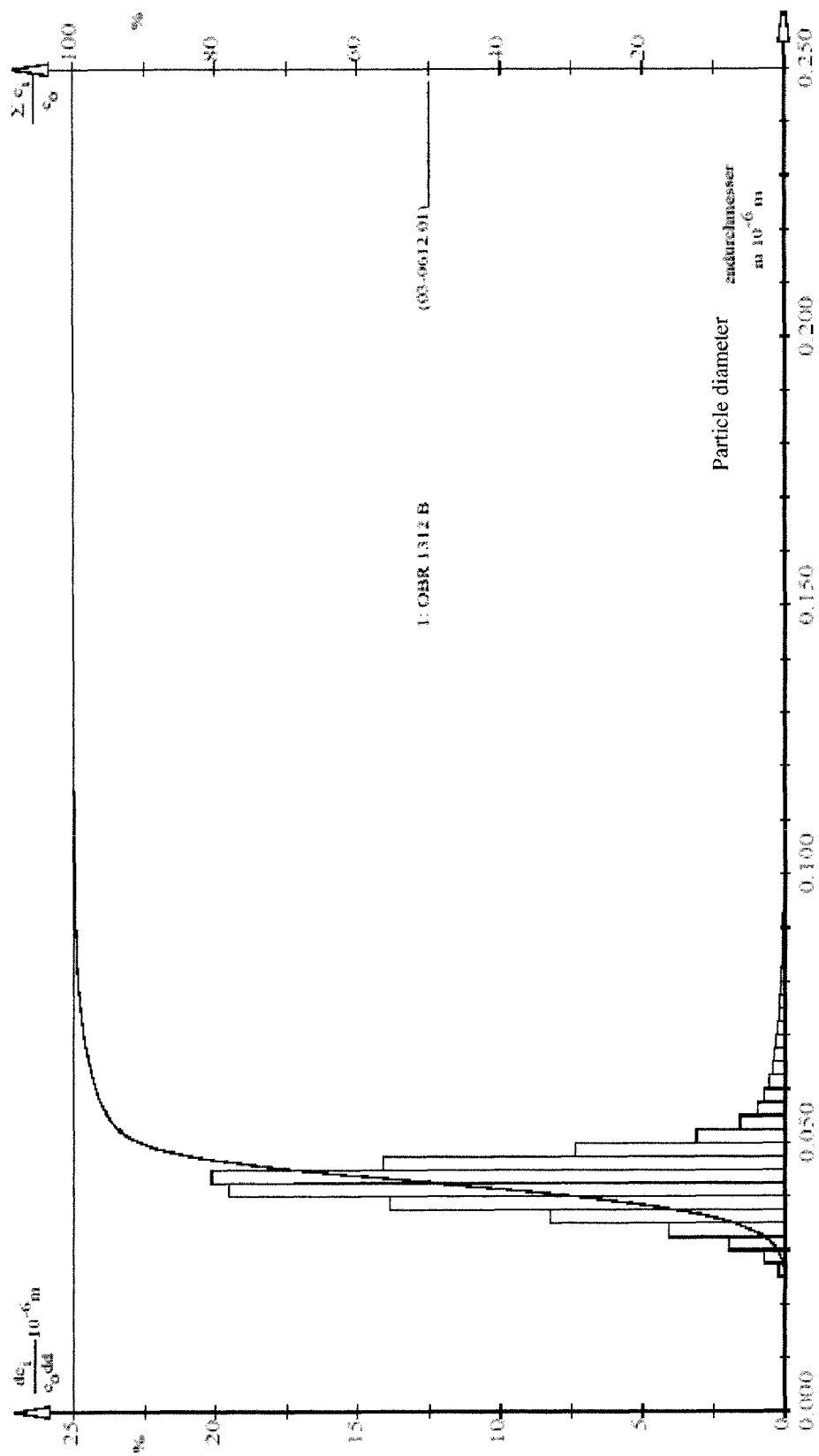
FIG. 1 schematically graphs the differential and integral particle size distribution of sample OBR 1312B pre-drying in latex.
Figure 2:
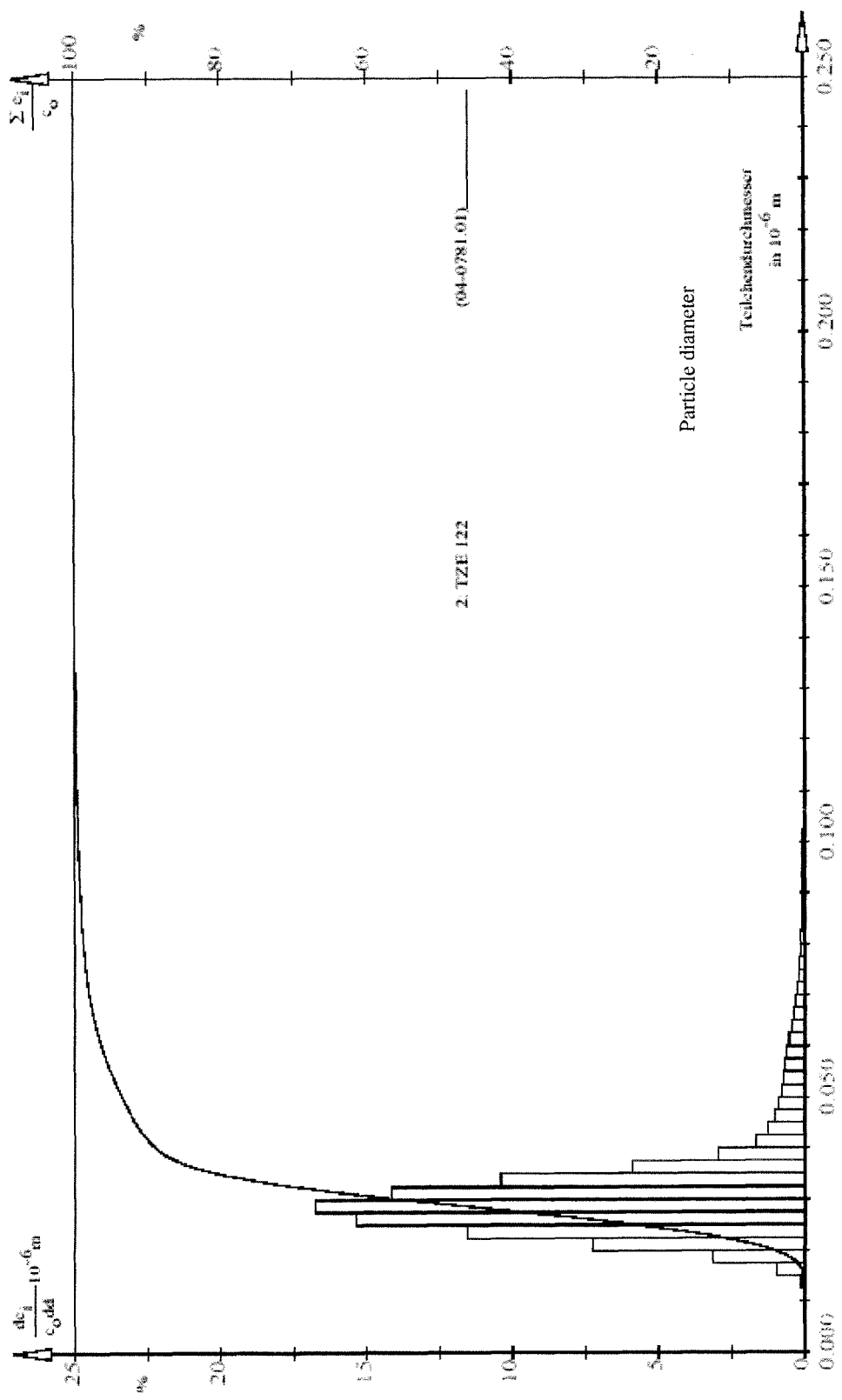
FIG. 2 schematically graphs the differential and integral particle size distribution of sample OBR 1312B post-drying and redispersed in Baylube 68CL (TZE 122).
Figure 3:
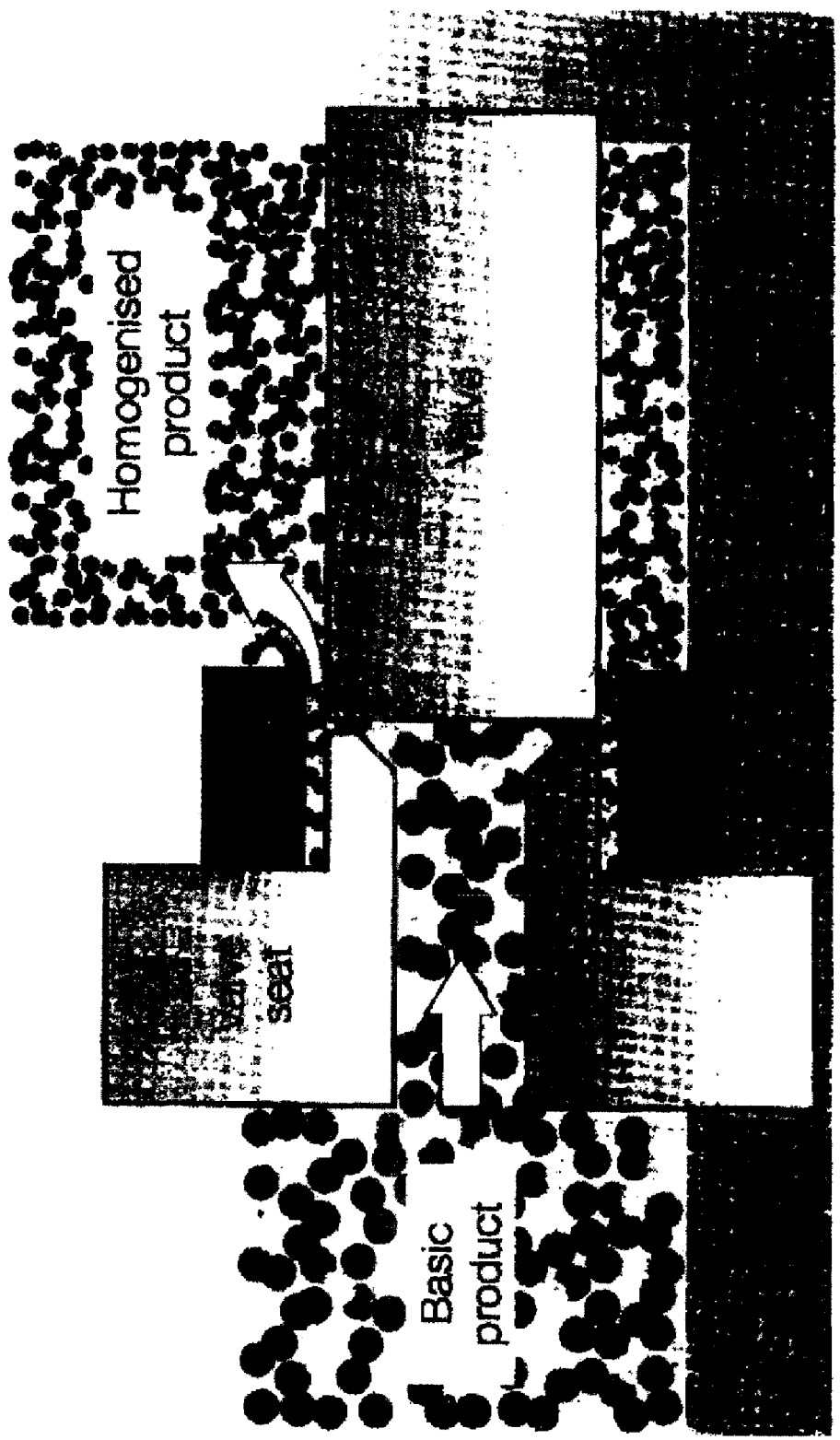
FIG. 3 schematically illustrates a manner of functioning a homogenizing valve.

Because of its low content of reagglomerated particles, the redispersed composition moreover is highly transparent.

The present invention has been described with reference to specific details of particular embodiments thereof. It is not intended that such details be regarded as limitations upon the scope of the invention except insofar as and to the extent that they are included in the accompanying claims.

As used in this specification and the appended claims, the singular forms "a," "an," and "the" include plural referents unless the content clearly dictates otherwise.

What is claimed is:

1. A composition comprising:
   10 to 99.9 wt. % of at least one non-crosslinkable organic medium (A) based on the total amount of the composition, said non-crosslinkable organic medium (A) having a viscosity of less than 30,000 mPas at a temperature of 120° C.;
   0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \qquad (I),$$

where d1 and d2 are each a diameter of the same individual primary particle measured and where d1 is greater than d2, and wherein the at least one microgel (B) has a swelling index in toluene at 23° C. of less than about 80.

2. The composition according to claim 1, wherein the non-crosslinkable organic medium (A) has a viscosity of less than 1,000 mPas at a temperature of 120° C.

3. The composition according to claim 1, wherein the non-crosslinkable organic medium (A) has a viscosity of less than 200 mPas at a temperature of 120° C.

4. The composition according to claim 1, wherein the individual primary particles of the microgel (B) have an approximately spherical geometry.

5. The composition according to claim 1, wherein said deviation is less than 50%.

6. The composition according to claim 1, wherein the at least one microgel (B) has a content which is insoluble in toluene at 23° C. of at least about 70 wt. %.

7. The composition according to claim 1, wherein the at least one microgel (B) is a crosslinked microgel which is not crosslinked by high-energy radiation.

8. The composition according to claim 1, wherein the at least one microgel (B) is obtained by emulsion polymerization.

9. The composition according to claim 1, wherein the at least one microgel (B) is based on homopolymers or random copolymers.

10. The composition according to claim 1, wherein the at least one microgel (B) is modified by functional groups which are reactive towards carbon-carbon double bonds (C=C).

11. The composition according to claim 1, wherein the at least one non-crosslinkable organic medium (A) is at least one compound selected from the group consisting of solvents, saturated or aromatic hydrocarbons, polyether oils, naturally occurring and synthetic ester oils, polyether-ester oils, phosphoric acid esters, silicon-containing oils, halohydrocarbons, and liquid renewable raw materials.

12. The composition according to claim 1, further comprising: a filler and/or an additive.

13. The composition according to claim 1, having a viscosity of 2 mPas up to 50,000,000 mPas at a speed of $5\ s^{-1}$, as determined with a cone-plate measuring system in accordance with DIN 53018 at 20° C.

14. The composition according to claim 1, wherein the at least one microgel (B) has a content which is insoluble in toluene at 23° C. of at least 95 wt. %.

15. The composition according to claim 1, wherein the at least one microgel (B) is not modified with hydroxyl groups.

16. The composition according to claim 1, wherein the at least one microgel (B) is not modified.

17. A composition comprising:
10 to 99.9 wt. % of at least one non-crosslinkable organic medium (A) based on the total amount of the composition, said non-crosslinkable organic medium (A) having a viscosity of less than 30,000 mPas at a temperature of 120° C.;
0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \qquad (I),$$

where d1 and d2 are each a diameter of the same individual primary particle measured and where d1 is greater than d2, and wherein the at least one microgel (B) has a glass transition temperature of −100° C. to +120° C.

18. A composition comprising:
10 to 99.9 wt. % of at least one non-crosslinkable organic medium (A) based on the total amount of the composition, said non-crosslinkable organic medium (A) having a viscosity of less than 30,000 mPas at a temperature of 120° C.;
0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \qquad (I),$$

where d1 and d2 are each a diameter of the same individual primary particle measured and where d1 is greater than d2, and wherein the at least one microgel (B) has a glass transition range of greater than about 5° C.

19. A composition comprising:
10 to 99.9 wt. % of at least one non-crosslinkable organic medium (A) based on the total amount of the composition, said non-crosslinkable organic medium (A) having a viscosity of less than 30,000 mPas at a temperature of 120° C.;
0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \qquad (I),$$

where d1 and d2 are each a diameter of the same individual primary particle measured and where d1 is greater than d2, and wherein the at least one microgel (B) is based on rubber.

20. A composition comprising:
10 to 99.9 wt. % of at least one non-crosslinkable organic medium (A) based on the total amount of the composition, said non-crosslinkable organic medium (A) having a viscosity of less than 30,000 mPas at a temperature of 120° C.;
0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \qquad (I),$$

where d1 and d2 are each a diameter of the same individual primary particle measured and where d1 is greater than d2, and wherein the at least one microgel (B) has a swelling index in toluene at 23° C. of 1 to 15.

21. A process comprising: incorporating a composition into a thermoplastic, a rubber, a thermoplastic elastomer, or mixture thereof, wherein said composition comprises 10 to 99.9 wt. % of at least one non-crosslinkable organic medium (A) based on the total amount of the composition, said non-crosslinkable organic medium (A) having a viscosity of less than 30,000 mPas at a temperature of 120° C.; 0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\%\ (I),$$

where d1 and d2 are each a diameter of the same individual primary particle measured and where d1 is greater than d2.

22. A process for the preparation of a microgel-containing rubber, comprising: incorporating a composition into a rubber, wherein said composition comprises 10 to 99.9 wt. % of at least one non-crosslinkable organic medium (A) based on the total amount of the composition, said non-crosslinkable organic medium (A) having a viscosity of less than 30,000 mPas at a temperature of 120° C.; 0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \tag{I},$$

where d1 and d2 are each a diameter of the same individual primary particle measured and where d1 is greater than d2.

23. A process for the preparation of a microgel-containing thermoplastic elastomer, comprising: incorporating a composition into a thermoplastic elastomer, wherein said composition comprises 10 to 99.9 wt. % of at least one non-crosslinkable organic medium (A) based on the total amount of the composition, said non-crosslinkable organic medium (A) having a viscosity of less than 30,000 mPas at a temperature of 120° C.; 0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \tag{I},$$

where d1 and d2 are each a diameter of the same individual primary particle measured and where d1 is greater than d2.

24. A process for the preparation of a composition, wherein said composition comprises 10 to 99.9 wt. % of at least one non-crosslinkable organic medium (A) based on the total amount of the composition, said non-crosslinkable organic medium (A) having a viscosity of less than 30,000 mPas at a temperature of 120° C.; 0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \tag{I},$$

where d1 and d2 are each a diameter of the same individual primary particle measured and where d1 is greater than d2, comprising: admixing the at least one non-crosslinkable organic medium (A) and the at least one microgel (B) via a homogenizer, a bead mill, a triple-roll mill, a single- or multiple-screw extruder, a kneader and/or a dissolver.

25. A process for the preparation of a composition, wherein said composition comprises 10 to 99.9 wt. % of at least one non-crosslinkable organic medium (A) based on the total amount of the composition, said non-crosslinkable organic medium (A) having a viscosity of less than 30,000 mPas at a temperature of 120° C.; 0.1 to 90 wt. % of at least one microgel (B) based on the total amount of the composition, said at least one microgel (B) comprising a plurality of individual primary particles, wherein the plurality of individual primary particles have an average particle diameter of less than 99 nm and wherein a deviation between the diameters of an individual primary particle is less than 250%, where said deviation is defined as being equal to formula (I)

$$[(d1-d2)/d2] \times 100\% \tag{I},$$

where d1 and d2 are each a diameter of the same individual primary particle measured and where d1 is greater than d2, comprising: admixing the at least one non-crosslinkable organic medium (A) and the at least one microgel (B) via a homogenizer, a bead mill, a triple-roll mill and/or a dissolver.

26. A composition comprising: 10 to 99.9 wt. % of at least one non-crosslinkable organic medium (A) based on the total amount of the composition, said non-crosslinkable organic medium (A) having a viscosity of less than 30,000 mPas at a temperature of 120° C.; and 0.1 to 90 wt. % of at least one microgel (B) based on the total amount of the composition, said at least one microgel (B) comprising a plurality of individual primary particles, wherein the plurality of individual primary particles have an average particle diameter of less than 99 nm, wherein the at least one non-crosslinkable organic medium (A) is selected from the group consisting of: hydrocarbons, ester oils, phosphoric acid esters, and mixtures thereof, wherein said hydrocarbons are selected from the group consisting of $C_1$-$C_{200}$, natural, synthetic, non-substituted, substituted, straight-chain, branched, cyclic, saturated, unsaturated, aromatic, and mixtures thereof and wherein the substituted hydrocarbons is by a substituent selected from the group consisting of chlorine, hydroxyl, oxo, amino, carboxyl, carbonyl, aceto and amido.

* * * * *